United States Patent
Bonta et al.

[11] Patent Number: 6,097,957
[45] Date of Patent: Aug. 1, 2000

[54] RADIOTELEPHONE SERVICE PLANNING SYSTEM AND METHOD FOR DETERMINING A BEST SERVER FOR A COMMUNICATION CONNECTION

[75] Inventors: Jeffrey D. Bonta, Arlington Heights; Gerald J. Gutowski, Palatine, both of Ill.

[73] Assignee: Motorola, Inc., Schaumburg, Ill.

[21] Appl. No.: 08/970,701

[22] Filed: Nov. 14, 1997

[51] Int. Cl.[7] ................................................ H04Q 7/36
[52] U.S. Cl. .......................... 455/446; 455/67.3; 455/67.7
[58] Field of Search ................................. 455/446, 447, 455/448, 449, 454, 67.1, 67.3, 67.7

[56] References Cited

U.S. PATENT DOCUMENTS

| | | | |
|---|---|---|---|
| 5,095,500 | 3/1992 | Tayloe et al. | 455/446 |
| 5,179,722 | 1/1993 | Gunmar et al. | 455/67.7 |
| 5,490,285 | 2/1996 | Ahlenius et al. | 455/67.7 |
| 5,561,841 | 10/1996 | Markus | 455/446 |
| 5,640,677 | 6/1997 | Karlsson | 455/449 |
| 5,758,264 | 5/1998 | Bonta et al. | 455/67.7 |
| 5,875,391 | 2/1999 | Riley et al. | 455/562 |

FOREIGN PATENT DOCUMENTS

0399845A2  11/1990  European Pat. Off. .

*Primary Examiner*—Edward F. Urban
*Attorney, Agent, or Firm*—Kenneth A. Haas

[57] ABSTRACT

A radiotelephone service planning system (10) and method determines best servers in communication systems by determining a interference based communication threshold using interference information (46), such as frame error rate data, in addition to pathloss information (38) between a communication unit (22) and the plurality of other communication units (24a–24c). The radiotelephone service planning system (10) and method generates an image indicating the most probable best server of the other communication units (24a–24c) for the communication unit (22) based on the interference based communication threshold information. Also, the system utilizes variable signal threshold data (32) for a communication unit to allow flexibility in determining a best server site in view of varying threshold limits. If desired, the system can also accommodate three-dimensional best server planning by taking into account elevational variations and their effects from the perspective of both the mobile communication unit and the other communication unit.

31 Claims, 3 Drawing Sheets

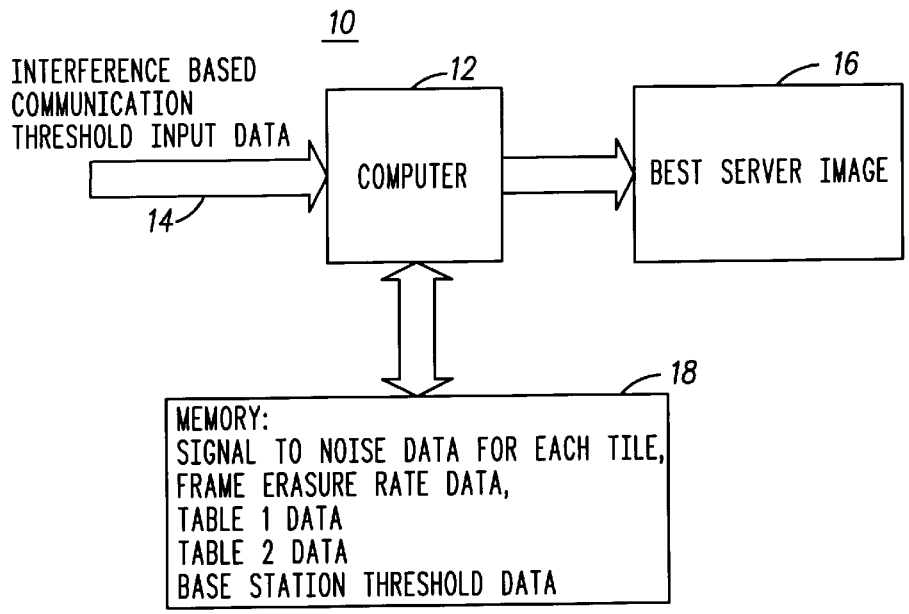
FIG.1
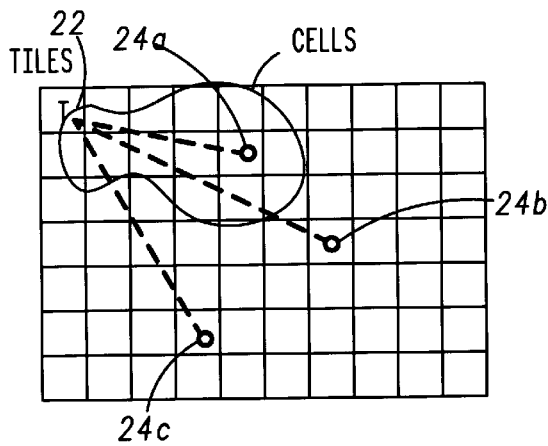
FIG.2
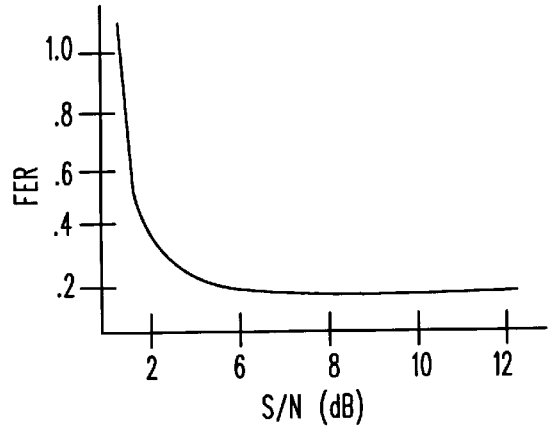
FIG.5
| BEST SERVER BY TILE | |
|---|---|
| TILE # | BEST SERVER CELL |
| 1 | B |
| n | |
TABLE 1
FIG.6
| | PATHLOSS | | |
| | SIGNAL/NOISE | | |
| FIXED COMM | SSI FOR EACH TILE | | |
| UNIT(CELL) | TILE1 | TILE2 | TILEn |
|---|---|---|---|
| A | X | | |
| B | Y | | |
| C | HOLE | | |
| .. | | | |
TABLE 2
FIG.7

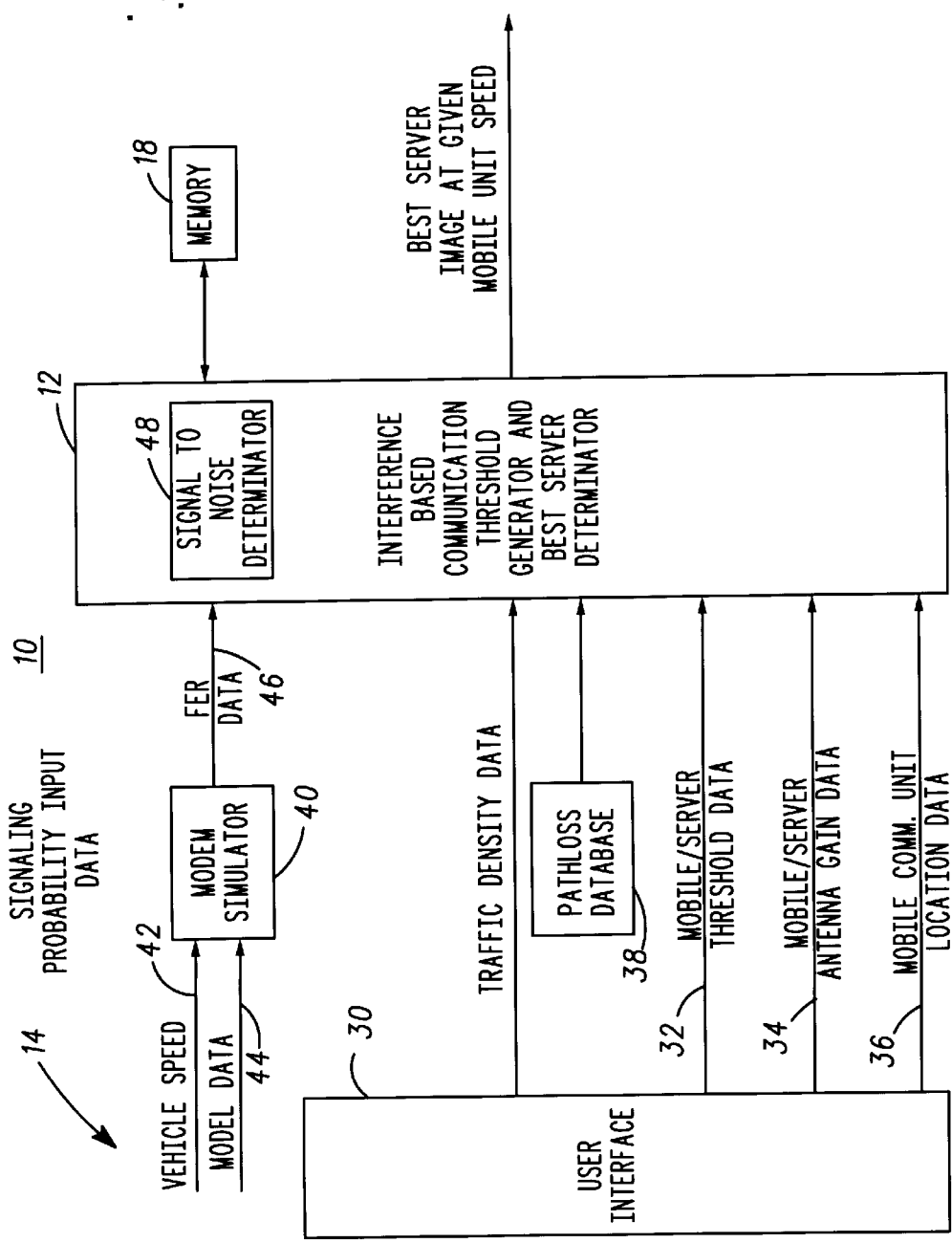

RADIOTELEPHONE SERVICE PLANNING SYSTEM AND METHOD FOR DETERMINING A BEST SERVER FOR A COMMUNICATION CONNECTION

FIELD OF THE INVENTION

The invention relates generally to systems and methods for determining a best server for a communication connection of a communication unit among a plurality of other communication units and more particularly to radiotelephone service planning systems and methods that determine a best server for originating a communication, such as a call.

BACKGROUND OF THE INVENTION

Radiotelephone service planning methods and systems are known which are used by system planners to determine which unit of a group of other communication units, such as a cellular base station, is the best server to provide a communication connection for another communication unit, such as a mobile unit. Known radiotelephone service planning systems and methods provide server images which typically aim to provide a color map view of the fixed communication unit which is most likely to best serve a mobile unit in a specific location. Generally, conventional radiotelephone service planning systems and methods generate the best server images based primarily on estimated or measured pathloss at specific locations. The pathloss is typically defined for a series of locations across a geographical area. For example, the system is typically divided up into Cartesian squares or tiles of X meters by Y meters and signal strength levels are used without consideration of interference factors. The resulting color images represent antenna footprints so that a system planner can visually determine coverage area for a given fixed communication unit. It has been found however that such systems do not provide accurate coverage models for many radiotelephone systems, particularly where buildings, high traffic densities, large elevational changes, and other factors are present in a given radiotelephone communication system. Because conventional systems rely primarily on pathloss determinations, the interference and degradations caused by other communication units and physical obstructions and elevational variations can cause a fixed communication unit to effectively be an improper best server because of these other factors. Consequently, conventional best server detection systems will designate a best server when in fact communication can be lost with that server in normal operating conditions. These factors can lead to poor system planning and costly reconfigurations of multimillion dollar systems.

In addition, traditional radiotelephone service planning systems and methods do not typically allow for variably setting signaling thresholds on a per fixed communication unit basis to allow flexibility in planning the system to overcome perceived lower communication quality links within the system. In addition, typical radiotelephone system planning systems do not also take into account the rate of movement of a mobile communication unit within a fixed communication unit communication area. Hence, if a mobile communication unit is traveling at a faster rate to or from a fixed communication unit, another fixed communication unit may be a best server during such conditions. Hence after a system is planned with conventional planning tools, mobile communication units can be improperly dropped from the system because such considerations were not accounted for during the planning process.

Accordingly, there exists a need for an improved radiotelephone service planning system and method that more accurately determines a best server for a communication connection for a plurality of other communication units. Such a system should provide a visual image or other indication to a user that more adequately illustrates the most probable actual coverage and best server for a given system. It would be advantageous to take into account other system related factors that can affect a determination of a best server.

BRIEF DESCRIPTION OF THE DRAWINGS

FIG. 1 is a block diagram generally illustrating one embodiment of a radiotelephone service planning system in accordance with the invention.

FIG. 2 is a graphic illustration generally indicating a communication coverage area having multiple fixed communication units and a mobile communication unit for which a best server is determined in accordance with one embodiment of the invention.

FIG. 3 is a block diagram generally showing in more detail the system of FIG. 1.

FIG. 5 is a curve that may be generated to determine an interference based communication threshold in accordance with one embodiment of the invention.

FIG. 6 is a table showing identification of a best server for an associated tile in accordance with one embodiment of the invention.

FIG. 7 is a table generally showing stored information in memory used by the system of FIGS. 1 and 3 in accordance with one embodiment of the invention; and FIGS. 8.1 and 8.2 are examples of differences between a traditional best server coverage determination for a cell sector and a best server coverage determination in accordance with one embodiment of the invention.

DETAILED DESCRIPTION OF A PREFERRED EMBODIMENT

Figure 4:
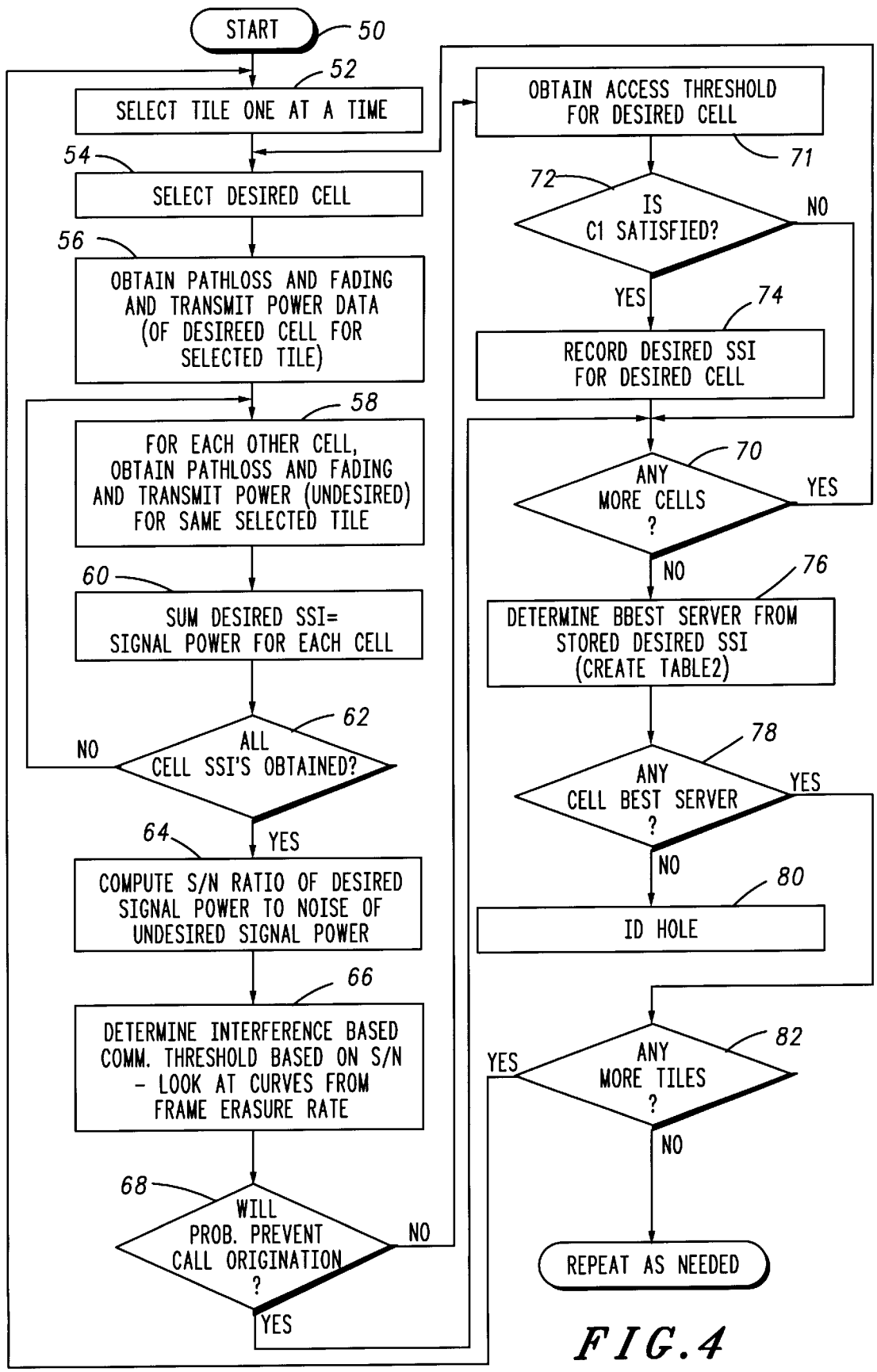
FIG. 4 is a flowchart generally illustrating one embodiment of the operation of the system of FIG. 3 in accordance with one embodiment of the invention.

A radiotelephone service planning system and method is disclosed for determining best servers in communication systems based on an interference based communication threshold. The system and method determines the interference based communication threshold using interference information, such as frame error rate data. The radiotelephone service planning system and method generates an image indicating the most probable best server for the communication unit based on the interference based communication threshold information. Also, the system utilizes variable signal threshold data for a communication unit, such as a mobile communication unit, or a base station receiving threshold, to allow flexibility in determining a best server site in view of varying system threshold limits.

If desired, the system can also accommodate three-dimensional best server planning by taking into account elevational variations and their effects from the perspective of both the mobile communication unit and the fixed communication unit. In addition, the system facilitates best server determination by also taking into account traffic density profiles so that both uplink and downlink interference factors between control channels and traffic channels are taken into account to more accurately determine a best server.

FIG. 1 shows, by way of example, a radiotelephone service planning system 10 having a computing device 12 such as a workstation or other suitable computer that receives and analyzes interference based communication threshold input data 14 to determine a best server and generate a best server image 16 that may be displayed on a computer screen for visual reference by a user. The computer 12 also includes memory 18 for storing signal to noise data for each tile, frame erasure rate data, signal to noise information on a per cell or per communication region basis, best server data indicating a best server for each tile designated for a coverage area, and base station variable communication acceptance threshold data when the system is applied to a digital cellular radiotelephone system. Based on the interference based communication threshold input data 14, the system 10 determines a interference based communication threshold between a communication unit, such as a mobile communication unit and a plurality of fixed communication units, such as cellular base stations in a coverage area. The interference based communication threshold is the probability that a communication can be sustained between the mobile unit and the fixed communication unit. Any suitable sustain period may be defined including instantaneous or longer period that may represent call setup times and call duration times. Depending upon the desired resolution of a best server determination, the system 10 may take into account both downlink and uplink interference criteria. The computer 12 generates an image indicating the most probable server for the mobile unit based on the interference based communication threshold determined from the interference based communication threshold input data 14. Therefore the system evaluates more than pathloss data in contrast with typical conventional best server service planning systems and methods.

The interference based communication threshold input data 14 may include, among other things, uplink and downlink interference values for a connection between the mobile communication unit and a number of potential servers. Interference values can include frame erasure rate data for a specified signal to noise ratio for a receiver and transmitter, namely the mobile unit and the base station, for a specific region in the coverage area. Interference values also preferably include uplink and downlink fading values such as log normal fading values, Rayleigh fading values, Racian fading values, or other suitable fading values that take into account obstructions in a communication path or other causes for signal fading. In addition, interference values include pathloss values as known in the art. The computer 12 obtains the interference values from software applications, user input or other suitable source.

FIG. 2 shows a coverage area 20 that has been divided into regions such as tiles 22 having an X-Y dimension such as in meters or other suitable dimension. For purposes of illustration, a mobile communication unit is shown to be in tile T and three fixed communication units 24a through 24c, such as cellular base stations, are evaluated to determine which of the three fixed communication units are the best server for initiating and maintaining a communication connection, such as a call, with the mobile communication unit located in tile T. It will be understood by those of ordinary skill in the art that the description herein with reference to a cellular radiotelephone system is but one example of a suitable system for the disclosed invention. For example, the system may be applied to systems containing macro cells, micro cells, non-cellular radiotelephone systems or any suitable communication system. However, for illustration purposes only a description will be set forth with reference to a cellular radiotelephone system.

FIG. 3 shows the computer 12 serving as the signal to noise determinator, interference based communication threshold generator and best server determinator. The system 10 includes a user interface 30, which may a graphic user interface, through which a user may control entry and receipt of data from other software applications, input threshold data or input information to generate models representing communication link characteristics for the given coverage area. For example, the user interface 30 may be used to enter mobile communication unit communication acceptance threshold data, such as a threshold level, (or server threshold acceptance data) 32 on a region by region basis such as a cell by cell or sector by sector basis and also variable acceptance threshold levels for a desired server. The computer receives the communication acceptance threshold data 32 through the user interface 30 and stores the communication acceptance threshold data 32 in memory 18. The user interface 30 also facilitates the entry of mobile communication unit and server antenna gain data 34 which may be varied to simulate variations in antenna gains among mobile communication units and/or fixed base stations. Also, communication unit location data 36, such as where the mobile communication unit is located, i.e. the tile, is also used by the computer 12. It will be recognized that although user interface 30 may facilitate the entry of such data, this information may be automatically entered from another software application if desired or any other suitable source. The system 10 also utilizes conventional pathloss data 38 such as that derived from a pathloss modeling application, for example, Motorola Xloss, available from Motorola Inc., Arlington Heights, Ill., USA. Such programs determine a pathloss value among a plurality of potential servers and a defined communication unit.

A modem simulator 40 may also be used to generate interference values for use in determining the best server. The modem simulator 40 simulates a radio link and allows the user to impair the radio link with radio channel models such as an urban model, which can include vehicle (communication unit) speed 42 and suitable model data 44 to simulate an urban environment, a rural environment, a mountainous environment or other suitable environment. For example, an urban model, such as a Gray typical urban (TU) model as understood in the art may be used.

The modem simulator 40 outputs frame erasure rate data 46, which is stored by computer 12 in memory 18, for computing frame erasure curves based on the frame erasure rate data 46. Hence for a given mobile communication unit and fixed communication unit, the modem simulator 40 generates interference values such as downlink frame erasure rate data 46 or frame erasure rate curves for a specified signal to noise ratio.

Preferably, the modem simulator 40 generates frame error rate data 46 for differing signal to noise ratios and mobile communication unit speeds. From the stored FER data, the computer 12 interpolates a frame erasure rate curve for use in determining frame erasure rates for any suitable communication unit speed. Frame erasure rates may be based on received signal strength indication (RSSI) as determined by the methodology in European Patent Application EP 0 399 845A2, published Nov. 28, 1990 assigned to instant assignee. Hence, the modem simulator may determine RSSI using a sliding correlation of received signal against a known sequence or via channel sounding to obtain the time-dispersal function of the communications channel upon which the signal is transmitted and a summation of the squares of the quadrature components of the energies at relative maxima of correlations to integrate the energy defined by the correlation function to determine the energy present among the time-dispersed echoes utilizing the time-dispersal function.

The computer 12 uses the interference data to take into account adjacent channel or reuse of channels and the interference generated from such operation. For example, a downlink interference calculation can be used to decode a BSIC (Base Site Identity Code) such as that used in a Groupe Speciale Mobile (GSM) type system, to simulate or model the way a mobile communication unit looks at a control channel of a base site controller (server). In a GSM type system, the channel structure makes use of a site identification method which uses a periodic sync channel as known in the art. The system 10 determines whether a mobile can sync to the sync channel or if there is too much interference so that it cannot. The system 10 therefore models the channel to determine whether a given mobile communication unit would report the base site that it is looking at indicating that it has synced with a specific site.

The computer 12 serves as the signal to noise determinator 48 which determines a signal to noise ratio based on the amount of noise in the modeled environment. The signal to noise determinator 48 requires as input, a desired power to interfering power ratio for both co-channel and adjacent channel users of the desired fixed communication unit's control channel, as well as a desired power to noise floor ratio of the desired fixed communication unit (where power= the transmit power value–(pathloss+fading)).

Referring to FIGS. 3 and 4, in operation, the system 10 is initialized as shown in block 50. The computer 12, after having divided the planning coverage area 20 into tiles, selects a tile one at a time as indicated in block 52, such as tile T. As shown in block 54, the system then selects a desired fixed communication unit, such as unit 24a and obtains the pathloss from pathloss database 38 and determines a fading value for communication to the mobile unit in tile T and the transmit power of fixed communication unit 24a for the tile T as shown in block 56. Transmit power values may be obtained from a system configuration database. Fading (Rayleigh) data may be obtained from a set of curves generated by the computer 12 based on execution of an algorithm capable of producing a Rayleigh faded waveform as known in the art. If used, lognormal fading data may be obtained from a database containing uncorrelated random lognormal fading distribution data for each tile location. The computer 12 obtains desired signal strength indication data by evaluating the pathloss, fading and transmission power data of the desired fixed communication unit for the selected region. For a downlink communication, the SSI is calculated by subtracting the pathloss between the transmitting antenna of the fixed communication unit and corresponding mobile communication unit receiver plus the fading components of the signal from the transmit power. Then the computer 12 computes a number of decibels (dB) the signal is above the receiver noise floor.

As indicated in block 58, the computer 12 also evaluates the pathloss value and fading value and transmit power of the other fixed communication units 24b and 24c (undesired since they will cause interference when communicating at the same time) for the same selected tile T to obtain the undesired signal strength indication. It will be recognized that consideration of signal burst durations which are not present for the entire timeframe, such as during discontinuous transmit operation, may be used if desired. The computer 12 sums the desired Signal Strength Indications (SSI) which correspond to the signal power for each fixed communication unit, as shown in block 60. The computer 12 determines if all cells have been evaluated with respect to the selected tile as shown in block 62. If not, the system continues for each other cell and obtains the interference values such as pathloss data, fading data and transmit power data to determine SSI. If however all cells (fixed communication units) have been evaluated, the signal to noise determinator 48 computes the signal to noise ratio of the desired signal power to noise relative to the noise generated by the undesired signal power of the other fixed communication units. This is shown in block 64. The description with respect to FIG. 4 is made with respect to a downlink communication, however it will be recognized that uplink communications may also be analyzed in a similar fashion.

As previously mentioned, the system 10 stores data representative of frame erasure rate data 46, where FER is the fraction of frames erased to total frames, for discrete signal to noise values for discrete communication unit speeds. Once stored, the computer 12 generates a FER curve by interpolating FER data for a given speed and signal to noise levels. Such a curve may be as shown in FIG. 5 where communication unit speed is 15 km/hr. Using the determined S/N ratio data and the stored frame erasure rate data, the computer 12 determines the interference based communication threshold as shown in block 66. The computer 12 looks up a corresponding curve, such as that shown in FIG. 5, for the given vehicle speed 42. Based on the determined S/N ratio, interference based communication threshold is determined. For example, in FIG. 5, if the S/N ratio is 6 dB, then the FER is equal to 0.2. If FER=0.2, then a frame is erased 2 times out of 10. To determine whether a frame is erased when the signal to noise ratio is 6 dB and the vehicle speed is 15 km/hr, the computer generates a random number between 0–1.

The computer 12 then determines whether the FER will prevent call origination from that fixed communication unit as shown in block 68. If the random number is less than or equal to 0.2, e.g. 0.1, the computer determines that the FER is too high to sustain communication since the frame is highly likely to be erased. However, if the random number is greater than 0.2, e.g. 0.5, the computer determines that the frame is not erased and communication can be maintained. In this example, 0.2 is the interference based communication threshold. It will be recognized that other criteria other than FER data may serve as the interference based communication threshold. For example, bit error rates, phase offsets and frequency offsets may be used as interference criteria from which to derive the interference based communication threshold. If the system determines that the interference based communication threshold will prevent a call being originated by the mobile communication unit for that given fixed communication unit in view of the interference values, the system determines whether there are any more fixed communication units within the coverage area to evaluate as a best server site as shown in block 70. If however, the interference based communication threshold data indicates that a call will not be prevented based on origination, the system obtains the variable acceptance threshold data 32 as stored in memory 18 as shown in block 71.

Based on the variable acceptance threshold data 32 and the interference based communication threshold, the system determines whether a call can be originated, or communication maintained, by using an origination threshold level calculation such as the C1 equation in the GSM system as known in the art. This is shown in block 72. In a GSM type system, when obtaining interference values, the computer 12 determines whether control channel data (channel having the BSIC) can be decoded by the communication unit by comparing the calculated (estimated) signal to noise ratio and pre-stored frame erasure rate data for a given communication unit speed setting.

Hence, if C1 is satisfied indicating that a sufficient signal to noise ratio is present, the system records the desired signal strength indication for the designated server as shown in block 74. The system then determines whether there are any more cells to evaluate as shown in block 70. If there are more fixed communication units to evaluate, the system then selects another fixed communication unit such as fixed communication unit 24b and performs the same process with respect to same tile T for that newly selected fixed communication unit. The process continues until all fixed communication units within the covered region have been evaluated with respect to the single tile. The process is then repeated for each tile within the coverage area.

If no more fixed communication units or servers need to be considered, the system 10 determines the best server from the stored desired SSI value as indicated in block 76. The system creates a table such as Table 1 shown in FIG. 6 for the tile T indicating the best server site for each tile. As shown in block 78, if no fixed communication units have an acceptable SSI with respect to that tile, the system indicates that a serving hole exists for that tile as indicated in block 80. If a fixed communication unit can be considered a best server, the system determines whether there are any more tiles to be evaluated. If so, the system then continues as shown in block 82. If no tiles need to be evaluated, the system then waits until any additional threshold data, antenna gain data, location data or any other data is modified and the user wishes to rerun a best server analysis. The system preferably stores data representing that shown in FIG. 7 indicated as Table 2 where for each fixed communication unit or server, the signal strength for each tile is listed with respect to that cell, in addition a signal to noise data for that cell versus the tile and the pathloss for the cell versus the tile is also recorded.

Therefore, the system 10 uses mobile communication unit characteristics or signaling characteristics of the system to determine a best server as opposed to simply using pathloss data. In addition, the system prioritizes, in a list, the order of the best cell site so that if the highest priority best server is unavailable or capacity does not permit its use, the next best server is selected. By allowing a user to input mobile communication unit signal threshold data or server threshold data, the operator is allowed to parameterize the system to evaluate whether coverage can vary by varying call origination signal threshold levels. For ease in calculation, the system preferably assumes that the mobile communication unit is located on each tile and set at zero change in speed. However if desired, a variable fading factor can be included to simulate movement of a mobile communication unit within a tile if desired. Hence a change in fading a long distance can simulate speed. If multiple speeds are being evaluated or if multiple random number draws are taken for the same speed, the interference based communication threshold may take each FER or each random draw for each speed into account to determine the likelihood of successful communication FIGS. 8.1 and 8.2 show an example of the difference between a traditional best server determination (image in FIG. 8.1) and an enhanced best server determination based on the aforedescribed system and methodology (image in FIG. 8.2). As shown, the enhanced best server analysis indicates that more hand-offs may have to occur in an area normally indicated by traditional best servers as having continuous acceptable coverage, but that the server has a propensity for long distance origination. The image in FIG. 8.2 was generated using a variable acceptance threshold level to determine coverage changes for varying origination threshold levels.

In another embodiment, three-dimensional best server analysis can be accommodated by obtaining elevational interference values representing differing elevations of a designated communication unit or server and determining a best server based on the elevational interference values. For example, pathloss data corresponding to differing heights of the mobile communication unit or fixed communication units can be used to determine a best server for varying communication units at varying heights in the same building, at varying heights due to uneven terrain, or at varying heights due to bridges or overpasses.

Moreover, since traffic channels may be adjacent to control channels, when a mobile communication unit is assigned a traffic channel during uplink communication, other communication units may be using the same channel resulting in uplink interference. The more traffic in a region, the more likely additional interference will result. The best server determination should also account for such occurrences and therefore the computer 12 may also receive and analyze variable traffic loading data or traffic density data representing additional interference for a given communication unit. This data may be entered as additional interference data through user interface 30.

It should be understood that the implementation of other variations and modifications of the invention in its various aspects will be apparent to those of ordinary skill in the art, and that the invention is not limited by the specific embodiments described. For example, the fixed communication units may be mobile communication units such as in a satellite based wireless communication system. It is therefore contemplated to cover by the present invention, any and all modifications, variations, or equivalents that fall within the spirit and scope of the basic underlying principles disclosed and claimed herein.

What is claimed is:

1. A radiotelephone service planning method comprising the steps of:

determining a best server for a communication connection of a communication unit with a plurality of other communication units based on a probability that a communication can be sustained between the communication unit with each of the plurality of other communication units; and generating a visual best server image indicating a best server out of the plurality of other communication units, wherein the best server comprises a server having a greatest probability that the communication can be sustained with the communication unit;

wherein determining the best server includes:

storing frame erasure rate data for given signal to noise levels and communication unit speeds, determining an interference based communication threshold value representative of whether a communication connection can be maintained with a desired other communication unit based on the stored frame erasure rate data, receiving a variable acceptance threshold level for the desired server, determining whether communication can be maintained based on the interference based communication threshold and the acceptance threshold level, and selecting a best server in response to determining whether communication can be maintained based on the interference based communication threshold and the acceptance threshold data.

2. The method of claim 1 wherein determining the best server includes obtaining interference values for a connection between the communication unit and the plurality of other communication units.

3. The method of claim 2 wherein the interference values are downlink interference values.

4. The method of claim 2 wherein the interference values are uplink interference values.

5. The method of claim 2 wherein the step of obtaining interference values includes determining a pathloss value among a plurality of potential servers from the plurality of other communication units and the communication unit.

6. The method of claim 2 wherein the step of obtaining interference values includes determining a lognormal fading value for communication to the communication unit.

7. The method of claim 2 wherein the step of obtaining interference values includes determining a Rayleigh fading value for communication to the communication unit.

8. The method of claim 2 wherein the step of obtaining interference values includes determining a Racian fading value for communication to the communication unit.

9. The method of claim 2 wherein the step of obtaining interference values includes determining whether control channel data can be decoded by the communication unit by comparing an estimated signal to noise value and pre-stored frame erasure rate data for a given communication unit speed setting.

10. The method of claim 2 wherein the step of obtaining interference values further includes obtaining elevational interference values representing differing elevations of a designated communication unit and determining a best server based on the elevational interference values to facilitate three-dimensional best server analysis.

11. The method of claim 2 wherein the step of obtaining interference values further includes obtaining elevational interference values representing differing elevations of the best server and determining a best server based on the elevational interference values to facilitate three-dimensional best server analysis.

12. The method of claim 1 wherein determining best server includes evaluating a variable communication acceptance threshold.

13. The method of claim 1 wherein determining the best server includes determining a frame erasure rate for the communication unit.

14. The method of claim 1 wherein the radiotelephone planning method determines a best server for a cellular radiotelephone system and the step of determining the best server includes the steps of:
dividing a planning coverage area to be analyzed into regions,
selecting one region at a time and selecting a desired other communication unit in the selected region,
obtaining desired signal strength indication data by evaluating at least pathloss, fading and transmission power data of the desired other communication unit for the selected region,
obtaining undesired signal strength indication data by evaluating at least pathloss, fading and transmit power data with respect to the selected region for each other communication unit in the planning coverage area,
summing desired signal strength indication data for each other communication unit,
determining a signal to noise value of desired signal power, as compared to noise of undesired signal power,
storing frame erasure rate data for given signal to noise levels,
based on the determined signal to noise value of desired signal power and using the stored frame erasure rate data, determining a interference based communication threshold representative of whether a communication connection can be maintained with the desired other communication unit,
receiving an acceptance threshold level for the desired other communication unit,
determining whether communication can be maintained based on the interference based communication threshold and the acceptance threshold level,
storing a desired signal strength indication data for the desired other communication unit,
selecting a best server for the selected region based on a highest stored signal strength indication data.

15. The method of claim 1 including the step of determining holes in a planned coverage area based on the interference values and varied acceptance threshold levels.

16. The method of claim 1 including the step of utilizing variable communication unit acceptance threshold levels for communication unit access on a per sector basis.

17. A radiotelephone service planning system comprising:
means for determining a best server for a communication connection of a communication unit with a plurality of other communication units based on a probability that a communication can be sustained between the communication unit with each of the plurality of other communication units; and
means, operatively coupled to the means for determining, for generating a visual best server image indicating a best server out of the plurality of other communication units, wherein the best server comprises a server having a greatest probability that the communication can be sustained with the communication unit
wherein the means for determining a best server includes:
means for storing frame erasure data for given signal to noise levels and communication unit speeds,
means, operatively coupled to the means for storing, for determining the interference based communication threshold representative of whether a communication can be maintained for a desired other communication unit based on the stored frame erasure rate data,
means for receiving a variable acceptance threshold level for the desired server,
means, operatively coupled to the means for obtaining, for determining whether communication can be maintained based on the interference based communication threshold and the acceptance threshold level, and
means, operatively coupled to the means for receiving the variable acceptance threshold level, for selecting a best server for the selected region based on the interference based communication threshold and the acceptance threshold level.

18. The system of claim 17 wherein the means for determining determines the interference based communication threshold based on obtaining interference values for a connection between the communication unit and the plurality of other communication units.

19. The system of claim 18 wherein the interference values are downlink interference values.

20. The system of claim 18 wherein the interference values are uplink interference values.

21. The system of claim 18 wherein obtaining interference values includes determining a pathloss value among a plurality of potential servers from the plurality of other communication units and the communication unit.

22. The system of claim 18 wherein obtaining interference values includes determining a lognormal fading value for communication to the communication unit.

23. The system of claim 18 wherein obtaining interference values includes determining a Rayleigh fading value for communication to the communication unit.

24. The system of claim 18 wherein obtaining interference values includes determining a Racian fading value for communication to the communication unit.

25. The system of claim 17 wherein the means for determining determines the interference based communication threshold by evaluating a variable communication acceptance threshold.

26. The system of claim 25 including means for determining holes in a planned coverage area based on the interference values and the varied acceptance thresholds.

27. The system of claim 17 wherein the means for determining determines the interference based communication threshold based on determining a frame erasure rate for the communication unit.

28. The system of claim 18 wherein the means for determining determines whether control channel data can be decoded by a designated communication unit by comparing an estimated signal to noise value and pre-stored frame erasure rate data for a given communication unit speed setting.

29. The system of claim 17 wherein the means for determining obtains elevational interference values representing differing elevations of the communication unit and determines a best server based on the elevational interference values to facilitate three-dimensional best server analysis.

30. The system of claim 17 wherein the means for determining obtains elevational interference values representing differing elevations of the best server and determines a best server based on the elevational interference values to facilitate three-dimensional best server analysis.

31. The system of claim 17 wherein the means for determining facilitates varying a variable acceptance thresholds for communication unit access on a per sector basis.

* * * * *